(12) United States Patent
Druding et al.

(10) Patent No.: US 8,027,149 B2
(45) Date of Patent: Sep. 27, 2011

(54) ELECTROLYTIC CAPACITORS WITH MULTIPLE ANODES AND ANODE LEAD CONFIGURATIONS THEREOF

(75) Inventors: J. Michael Druding, Orchard Park, NY (US); Jason Hahl, Cheektowaga, NY (US); Anthony Perez, Wheatfield, NY (US); Ken Talamine, Amherst, NY (US)

(73) Assignee: Greatbatch Ltd., Clarence, NY (US)

( * ) Notice: Subject to any disclaimer, the term of this patent is extended or adjusted under 35 U.S.C. 154(b) by 553 days.

(21) Appl. No.: 12/177,372

(22) Filed: Jul. 22, 2008

(65) Prior Publication Data

US 2009/0279232 A1 Nov. 12, 2009

Related U.S. Application Data

(60) Provisional application No. 61/050,716, filed on May 6, 2008.

(51) Int. Cl.
*H01G 9/04* (2006.01)
*H01G 9/145* (2006.01)
(52) U.S. Cl. ......................... 361/508; 361/528; 29/25.42
(58) Field of Classification Search .................. 361/508, 361/509, 528–529, 541, 522; 29/25.42
See application file for complete search history.

(56) References Cited

U.S. PATENT DOCUMENTS

| | | | |
|---|---|---|---|
| 2,897,418 A * | 7/1959 | Call | ............................. 361/522 |
| 6,743,544 B2 | 6/2004 | Kim et al. | |
| 6,816,358 B2 | 11/2004 | Kida et al. | |
| 6,912,117 B2 | 6/2005 | Arai et al. | |
| 7,072,171 B1 | 7/2006 | Muffoletto et al. | |
| 2002/0167786 A1 | 11/2002 | Sano et al. | |
| 2004/0165338 A1 | 8/2004 | Arai et al. | |
| 2005/0117280 A1 | 6/2005 | Audo | |
| 2006/0262486 A1 | 11/2006 | Tadanobu et al. | |

FOREIGN PATENT DOCUMENTS

| | | | |
|---|---|---|---|
| JP | 06333544 | | 12/1994 |
| JP | 06333544 A | * | 12/1994 |
| JP | 08150488 | | 6/1996 |
| JP | 08150488 A | * | 6/1996 |

* cited by examiner

*Primary Examiner* — Eric Thomas
(74) *Attorney, Agent, or Firm* — Michael F. Scalise

(57) ABSTRACT

A capacitor comprising a cylindrical casing sidewall extending to closed first and second end walls and an anode assembly housed therein including a first, second and third anodes is described. Each anode comprises an anode sidewall extending to first and second anode end walls and a conductive lead extending therefrom. The anodes are in a side-by-side relationship within the casing with their respective sidewalls parallel to each other. The cathode of the capacitor may include a first conductive substrate supporting a cathode active material. The conductive substrate is wrapped around the anodes, and the cathode active material is disposed on the substrate at locations such that the respective sidewalls of the anodes are opposed by cathode active material. A separator is positioned between the side-by-side anodes and the cathode. The open volume within the casing is filled with an electrolyte, and the casing is hermetically sealed.

19 Claims, 12 Drawing Sheets

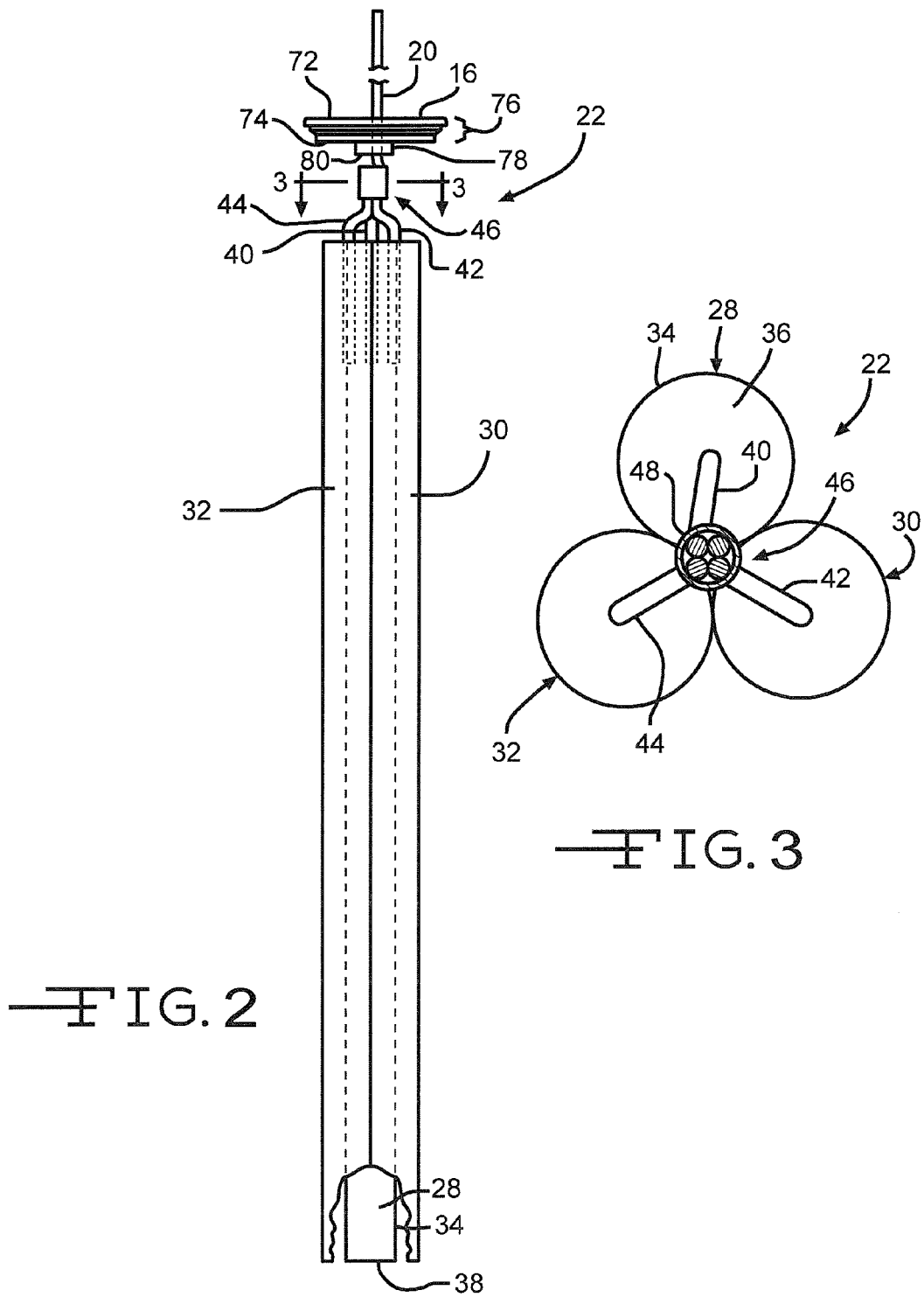

ELECTROLYTIC CAPACITORS WITH MULTIPLE ANODES AND ANODE LEAD CONFIGURATIONS THEREOF

CROSS-REFERENCE TO RELATED APPLICATION

This application claims priority from provisional application Ser. No. 61/050,716, filed May 6, 2008.

BACKGROUND OF THE INVENTION

1. Field of the Invention

The present invention generally relates to a capacitor and, more particularly, to a cylindrical capacitor. A compact cylindrical configuration can render a capacitor capable of being inserted into the vasculature of a patient.

2. Description of Related Art

Certain types of capacitors, such as a wet tantalum capacitor, may be designed and built to contain multiple anodes, which are sealed inside polypropylene and/or another separator material, prior to being assembled into an external case. For some applications in which the capacitor may be inserted into the vasculature of a patient, the overall capacitor configuration may be cylindrical with an aspect ratio (i.e. length:diameter ratio) much greater than one. The aspect ratio may be 10 or more. To obtain high energy density in the capacitor, the net combined shape of the anodes contained therein may also be cylindrical with comparable aspect ratios.

For example, U.S. Pat. No. 7,072,171 to Muffoletto et al., which is assigned to the assignee of the present invention and incorporated herein by reference, describes a capacitor comprised of a casing having a cylindrical casing sidewall extending to closed opposed first and second end walls; and a first anode and a second anode, each comprising a radiused anode sidewall meeting a planar sidewall portion extending to first and second anode end walls, wherein the anodes are in a side-by-side relationship having the respective planar sidewall portions facing each other. The capacitor further includes a cathode comprising a conductive substrate having first and second major faces supporting a cathode active material which opposes the sidewalls of the first and second anodes. The first and second anodes include respective anode leads extending from the first end walls thereof. The anode leads are joined to a terminal pin that is provided between the anodes and the first end wall of the casing.

There is a benefit to providing a capacitor with multiple anodes, i.e. at least two anodes, because further subdividing the anode material mass and providing corresponding opposed cathode material increases the overall active surface area of the capacitor electrodes. Thus, a greater overall capacitance can be attained within the same casing volume. However, there is a problem in that each anode is provided with its own lead, which must be electrically connected to a common anode terminal pin in a compact space. Accordingly, "multiple anode lead management" for capacitor configurations that include three or more anodes becomes critical in the overall capacitor design.

There is, therefore, a need to minimize the amount of non-active intradevice volume being utilized for connections between the anode leads and the terminal pin, and the adjoining glass-to-metal-seal (GTMS) assembly that seals and electrically insulates the terminal pin to the capacitor casing. There is also a need to maximize the ease of joining the anode leads to the terminal pin to enhance the reliability of their interconnection. There is also a need for an effective way to enclose three or more anodes within a cathode substrate such that the surfaces of the anodes are opposed by cathode active material.

SUMMARY OF THE INVENTION

In accordance with the invention, the problem of connecting two or more anodes to a terminal pin simply and reliably in a compact volume is addressed by forming the respective anode leads into a cluster and joining them at a compact bonding junction to the terminal pin. The capacitor may have an elongated cylindrical shape with a casing having a cylindrical casing sidewall extending to closed first and second end walls. The anode assembly includes at least a first anode and a second anode, with each anode comprising an anode sidewall extending to first and second end walls with a conductive lead extending there from. The anodes are in a side-by-side relationship within the casing with their respective sidewalls parallel to each other. The capacitor cathode includes a first conductive substrate supporting a cathode active material. The conductive substrate is wrapped around the anodes with the cathode active material being disposed on the substrate at locations opposed by the anodes. A separator is positioned between the side-by-side anodes and the cathode to prevent them from contacting each other. The open volume within the casing is filled with a working electrolyte, and the casing is hermetically sealed.

To form the bonding junction of the anode leads, the exposed ends of the leads may be formed into flat spades. The inner end of the terminal pin may also be formed into a flat spade. All of the flat spades are then stacked together and joined to each other to electrically connect the anode leads to the terminal pin.

Alternatively, a hoop may be provided to form the bonding junction of the anode leads. The hoop is compact and has an inner bore into which the exposed ends of the leads as well as the inner end of the terminal pin are inserted. The hoop is preferably of an electrically conductive material, and more preferably is of the same material as the terminal pin. In that manner, the hoop can be joined to the terminal pin and the anode leads by welding.

The respective anodes are preferably provided with a shape that maximizes the opposed surfaces of the anodes and cathode within the capacitor casing. To accomplish this, each of the anodes is comprised of a radiused anode sidewall portion meeting first and second planar sidewall portions, all extending to first and second anode end walls. The anodes are in a side-by-side relationship having the respective first and second planar sidewalls of adjacent anodes facing each other.

The problem of enclosing two or more anodes within a casing enclosure such that the anode surfaces are opposed by cathode active material is addressed by providing a cathode including a first conductive substrate supporting a cathode active material in which the conductive substrate is wrapped around the anodes. The cathode active material is disposed on the substrate at locations such that the respective sidewalls of the anodes are opposed by cathode active material. The cathode may be provided such that the first conductive substrate wraps around the first and second anodes. If the capacitor comprises a third anode, the cathode is further comprised of a second conductive substrate supporting cathode active material and wrapped around the third anode. Alternatively, the cathode may only include the first conductive substrate that wraps around the first, second and third anodes, with cathode active material located thereupon such that the anode sidewalls are each opposed by cathode active material.

The foregoing and additional objects, advantages, and characterizing features of the present invention will become increasingly more apparent upon a reading of the following detailed description together with the included drawings.

BRIEF DESCRIPTION OF THE DRAWINGS

The present invention will be described by reference to the following drawings, in which like numerals refer to like elements, and in which:

FIG. 2 is a side elevation view, partly broken away, showing an anode assembly 22 of the capacitor 10 of FIG. 1, including a header 16 supporting a terminal pin 20 in a glass-to-metal seal.

FIG. 3 is a cross-sectional view taken along line 3-3 of FIG. 2.

The present invention will be described in connection with preferred embodiments, however, it should be understood that there is no intent to limit the invention to the embodiments described. On the contrary, the intent is to cover all alternatives, modifications, and equivalents as may be included within the spirit and scope of the invention as defined by the appended claims.

DETAILED DESCRIPTION OF THE PREFERRED EMBODIMENTS

In describing the present invention, a variety of terms are used in the description. As used herein, unless noted otherwise, the term "conductive" is used with reference to electrical conductivity and is meant to indicate a property of a material as being electrically conductive at a level suitable for use in an electrical device such as a capacitor, or in an electrical circuit.

Figure 1:
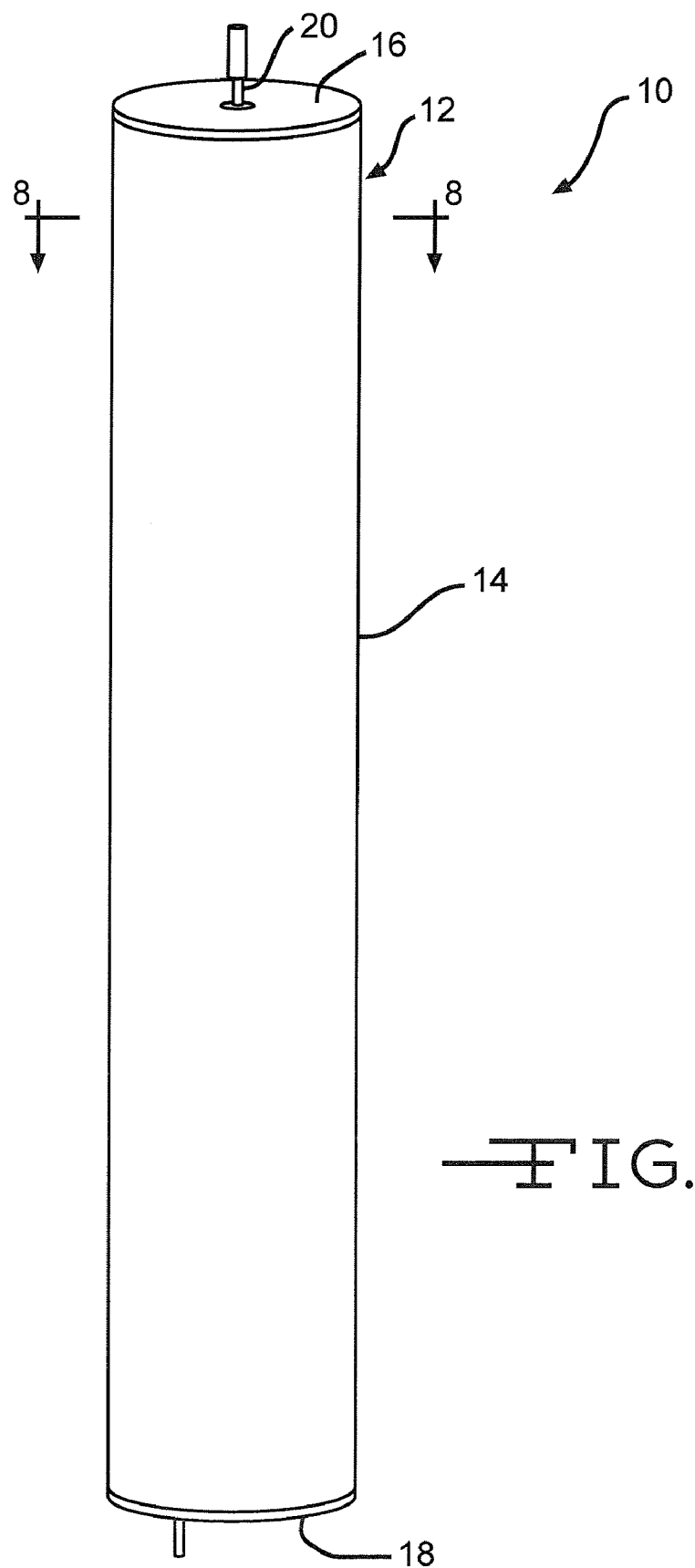
FIG. 1 is an perspective view of a capacitor 10 according to the present invention.

Referring now to the drawings, FIG. 1 shows an exemplary capacitor 10 according to the present invention. Capacitor 10 has an elongated cylindrical shape, although shapes other than cylindrical are contemplated. The capacitor comprises a casing 12 having a cylindrical casing sidewall or tube 14 extending to closed first and second end walls 16 and 18. The second end wall 18 may be formed separately as a cap that is fitted to the tubular sidewall 14 and sealed thereto. The first end wall 16 may also be formed as a cap that functions as a header for the passage and sealing of an anode terminal pin or lead 20 there through. In later parts of this specification, the end wall 16 will be referred to as casing header 16.

Figure 9:
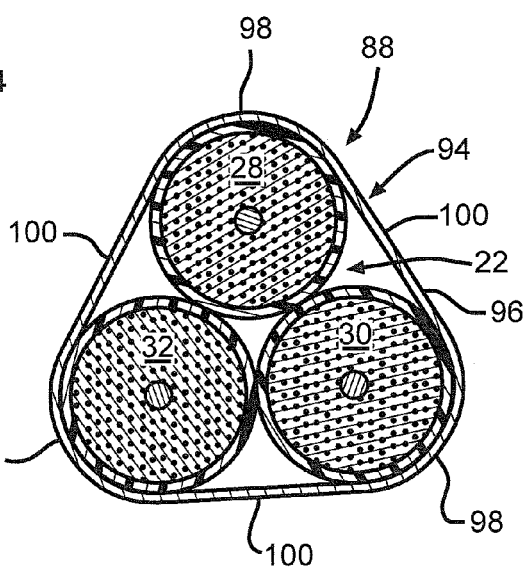
FIG. 9 is a cross-sectional view of the anode assembly 22 of FIG. 8 that is disposed in a casing 94 of an alternative shape.
Figure 10:
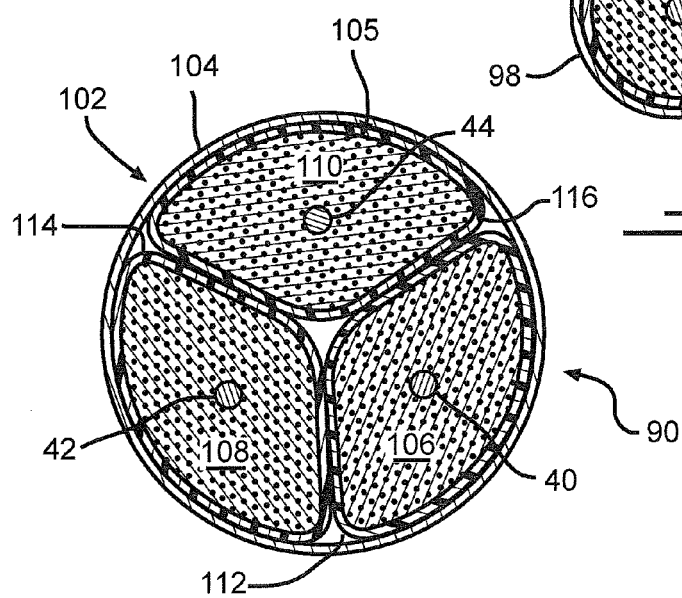
FIG. 10 is a cross-sectional view of an anode assembly 105 that is an alternative embodiment to the anode assembly 22 of FIG. 8.
Figure 11:
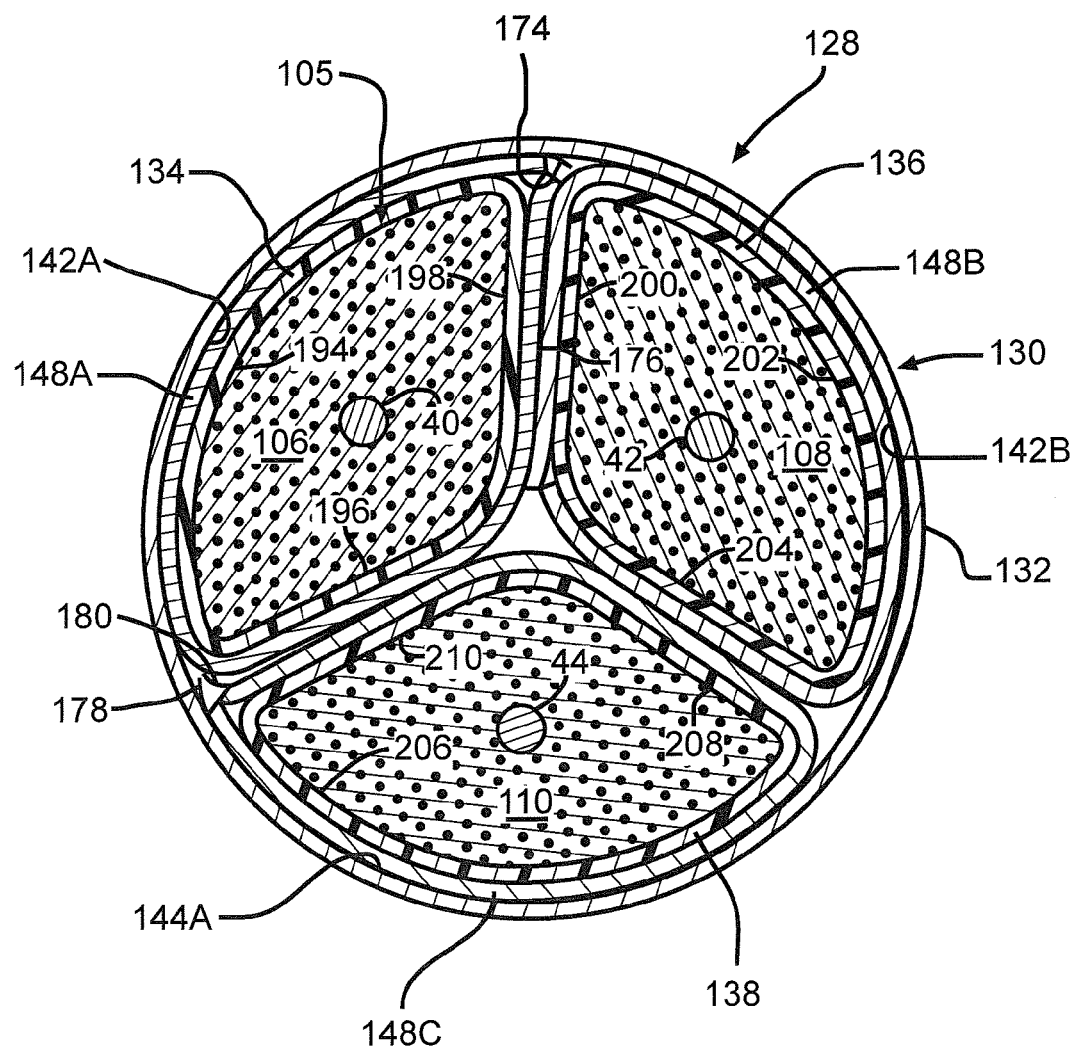
FIG. 11 is a detailed cross-sectional view of a capacitor 128 including the anode assembly 105 of FIG. 10, and a cathode 24 in a first configuration suitable for use with the anode assembly 105.
Figure 16:
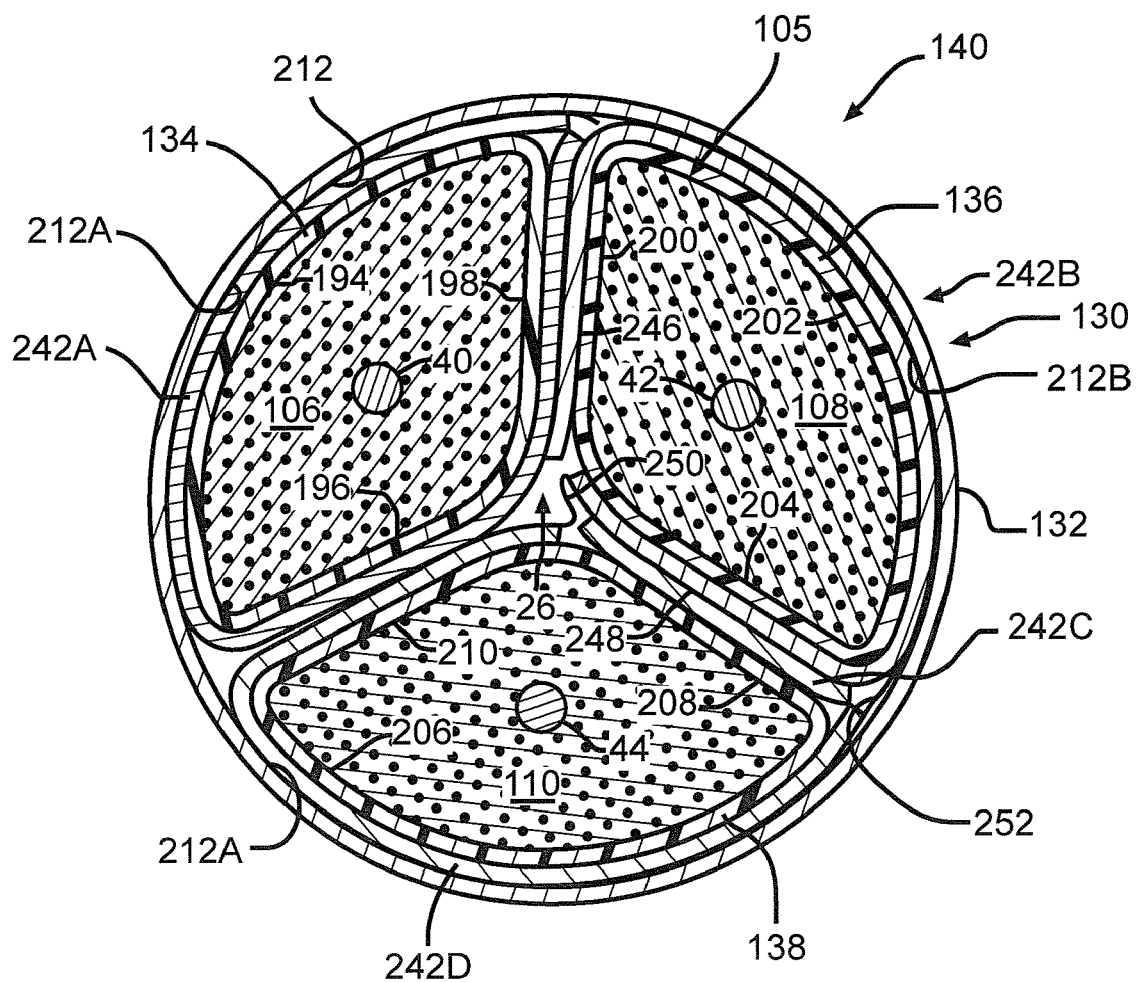
FIG. 16 is a detailed cross-sectional view of a capacitor 140 including the anode assembly 105 of FIG. 10, and a cathode 26 in a second configuration suitable for use with the anode assembly 105.

The capacitor 10 comprises an anode assembly 22 of three side-by-side anodes shown generally in FIGS. 2, 3 and 8 to 10, which are each formed as pellets of an anode active material, and a cathode wrapped around the anode pellets, such as cathode 24 of FIG. 11 or cathode 26 of FIG. 16. The anode assembly 22 and cathode 24 or 26 are hermetically sealed inside the casing 12 and operatively associated with each other by a working electrolyte (not shown) contained therein. The capacitor 10 is of an electrolytic type with the cathode 24 or 26 comprising a conductive substrate supporting cathode active material having capacitive properties. The cathodes 24 and 26 will be described in detail hereinafter.

Referring now in particular to FIGS. 2 and 3, one embodiment of the anode assembly 22 is shown, which is comprised of three cylindrical anodes 28, 30 and 32. However, it should be understood that shapes other than cylindrical are contemplated for the anodes; cylindrical is merely exemplary. The anodes 28, 30 and 32 may be formed as pellets of a powdered metal selected from the group consisting of tantalum, aluminum, titanium, niobium, zirconium, hafnium, tungsten, molybdenum, vanadium, silicon, germanium, and mixtures thereof. The preferred metal is tantalum powder compressed into a cylindrical shape, such as that of anode 28 having a sidewall 34 that extends to opposed planar end walls 36 and 38 disposed normal to the longitudinal axis of the anode pellet. Embedded anode wires or leads 40, 42 and 44 extend from the respective end walls of the anodes 28, 30 and 32. The anode wires 40, 42 and 44 are preferably made of the same material as the anode active material and are bent so that their distal ends are aligned adjacent to the planes of the anode pellet sidewalls.

The anode pellets 28, 30 and 32 are sintered under a vacuum at high temperatures and then anodized in a suitable electrolyte. The anodizing electrolyte fills the pores of the pressed powder bodies and a continuous dielectric oxide is formed thereon. In that manner, the anode pellets 28, 30 and 32 and their extending leads 40, 42 and 44 are provided with a dielectric oxide layer formed to a desired working voltage. The anodes can also be of an etched aluminum, niobium, or titanium foil.

After anodizing to the desired formation voltage, the anodes 28, 30 and 32 and extending leads 40, 42 and 44 are formed to provide the desired clustered spatial relationship when the anodes are brought into proximity with each other. The dielectric oxide is removed from the distal ends of the anode leads 40, 42 and 44 and they are connected in a bonding junction to the anode terminal pin 20, which is supported in a header 16 by an insulative glass-to-metal seal (not shown).

Figure 4:
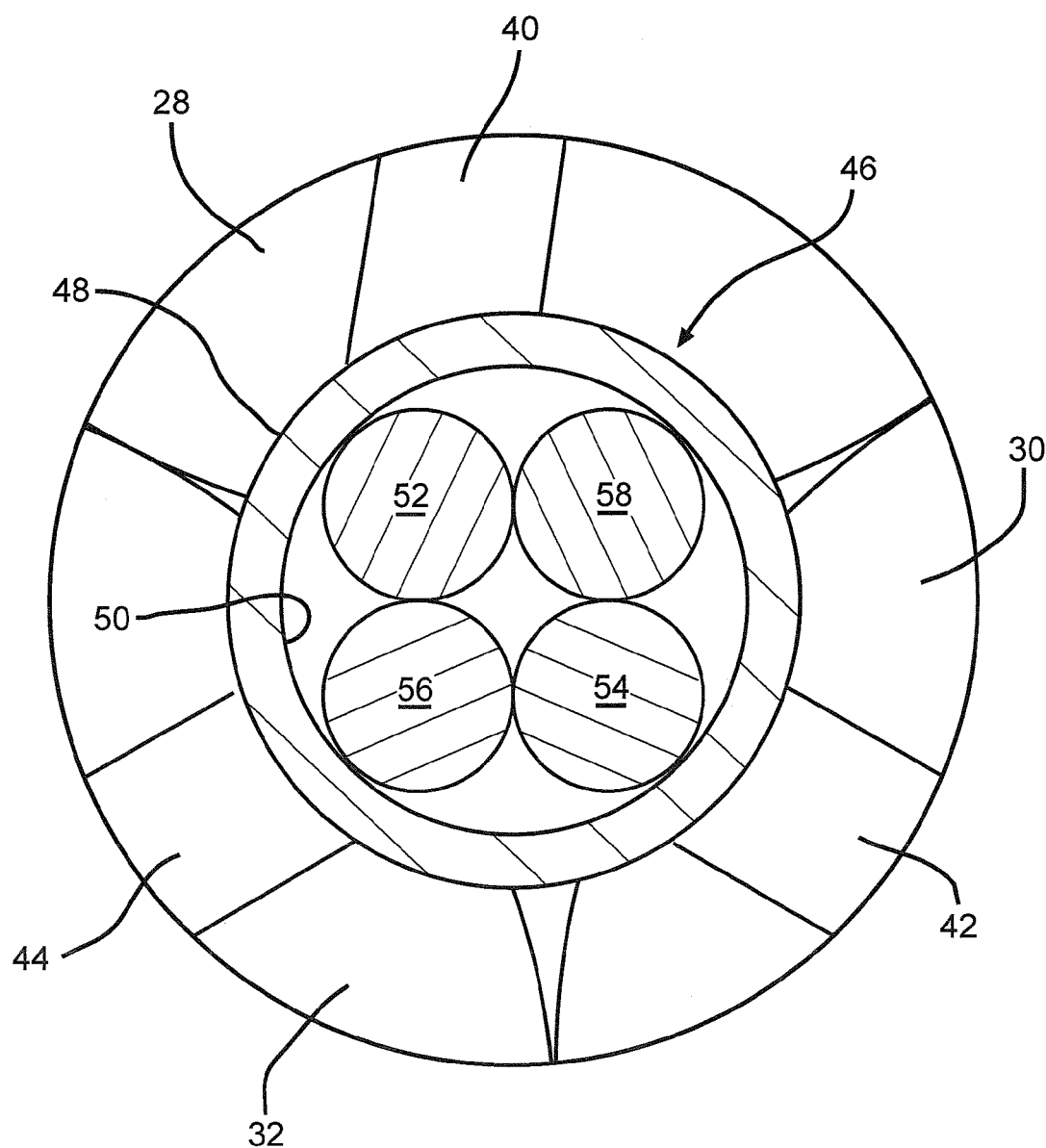
FIG. 4 is a detailed view of a first bonding junction 46 of the anode leads 40, 42 and 44 and the terminal pin 20 of the anode assembly 22 of FIG. 3.

In one embodiment depicted in FIGS. 2 to 4, a bonding junction 46 for joining the anode leads to the anode terminal pin is comprised of a hoop 48. The hoop 48 has an inner bore 50 into which the exposed distal ends 52, 54 and 56 of the respective leads 40, 42 and 44 are inserted, as well as the inner end 58 of the terminal pin 20. The hoop 48 is preferably of an electrically conductive material, and more preferably of the same material as the terminal pin 20. In that manner, the hoop 48 can be joined to the terminal pin 20 and the anode leads 40, 42 and 44 by welding. In order to provide the most reliable joining and electrical connection, it is preferable that each of the anode lead ends 52, 54 and 56 and the terminal pin end 58 are individually welded to the hoop 48.

The hoop 48 is preferably of a conductive material, and most preferably of the same material as the pins 52, 54, 56 and 58, although that is not required. All that is required is that the hoop 48 ensures that the anode leads 40, 42 and 44 contact at least one of their fellow leads and the terminal pin 20. In other words, there must be sufficient contact to provide electrical continuity from any one of the anode leads 40, 42 and 44 to the terminal pin 20. In that respect, the hoop 48 could also be a non-conductive material, for example, a piece of heat-shrink polymeric material.

Alternatively, the hoop 48 may be dimensioned such that when the last of the four lead ends 52, 54, 56 and the terminal pin end 58 are inserted into the bore 50 thereof, the cluster of ends is held within the bore 50 by an interference fit of the entire cluster therein.

Alternatively or additionally, a crimping tool (not shown) may be used to deform the hoop 48, thereby crushing the hoop 48 slightly to provide an interference-fit with the respective ends 52, 54, 56 and 58.

In the embodiment shown in FIGS. 2 and 3, the hoop 48 is formed as an elongated tubular sleeve. Alternatively, the hoop may be formed as a ring of material having a height approximately equal to its cross-sectional dimension normal to its central axis. In other words, the ring may have the shape and proportions of a typical O-ring having a circular or rectangular cross-section.

Figure 5:
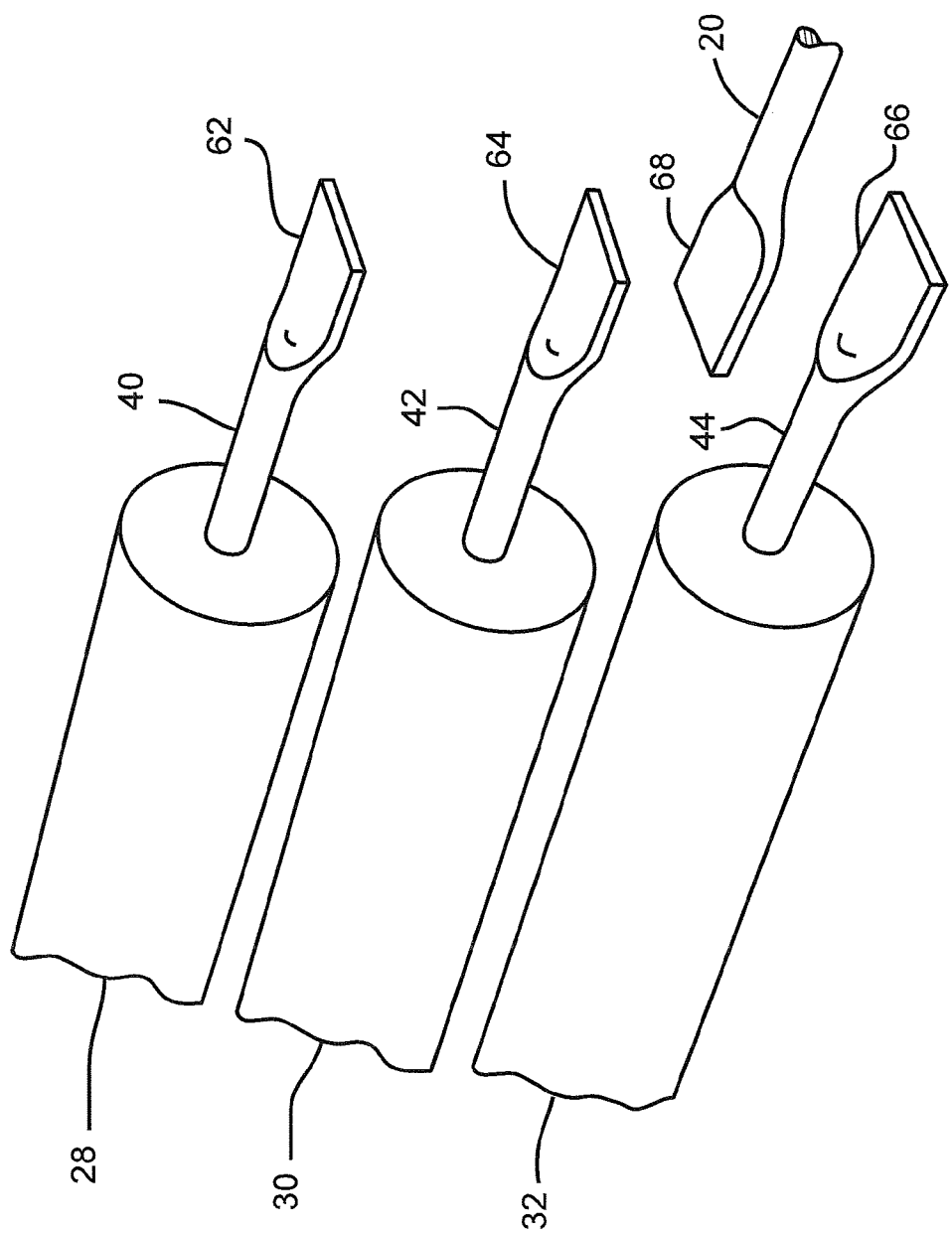
FIG. 5 is a perspective view of the ends of the anode leads 40, 42 and 44 and the terminal pin formed into flat spades 62, 64 and 66 prior to being joined together in a second bonding junction 60.
Figure 6:
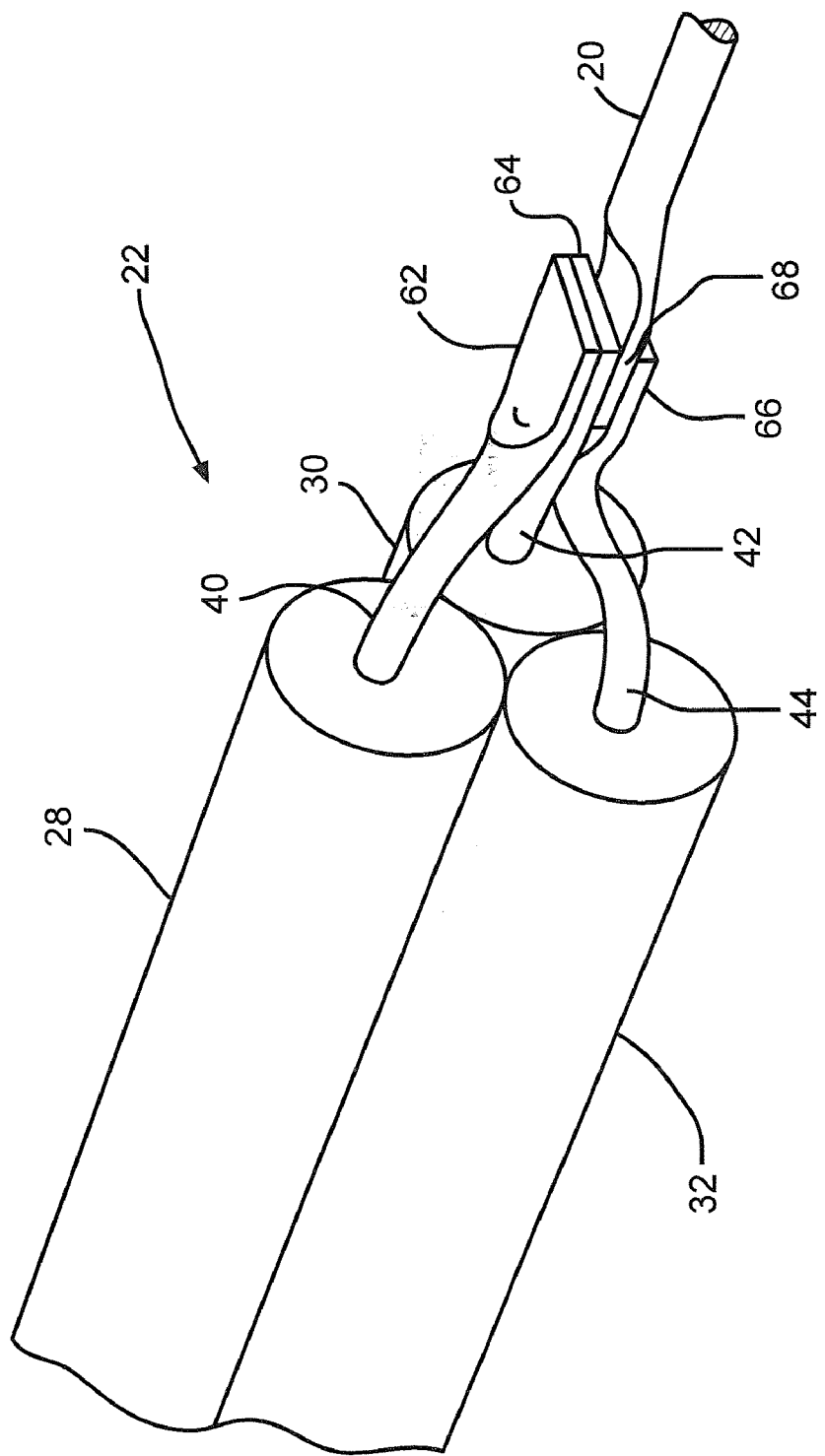
FIG. 6 is a perspective view of the flat spades 62, 64, 66 and 68 of the anode leads 40, 42 and 44 and the terminal pin 20 stacked together.
Figure 7:
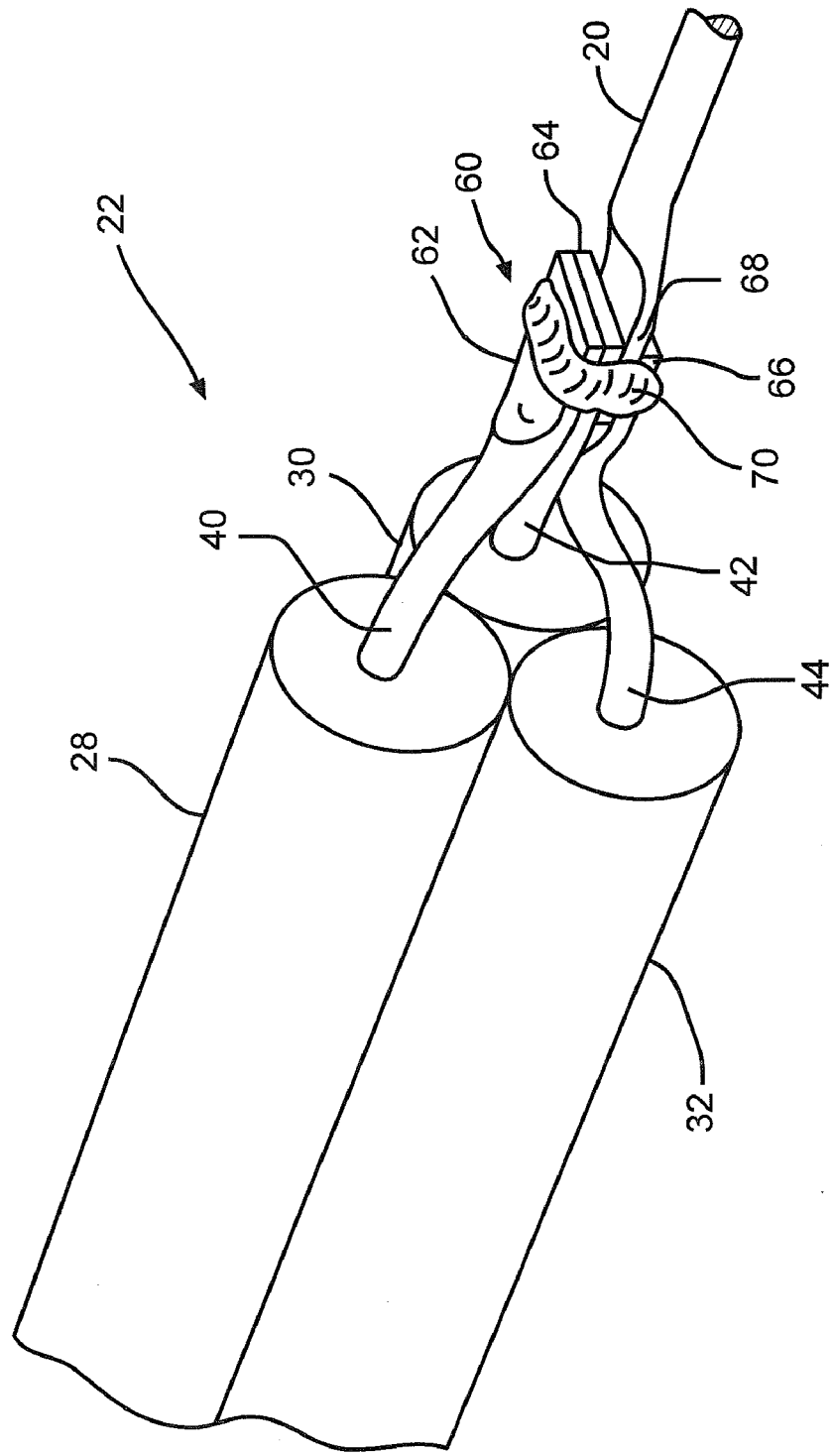
FIG. 7 is a perspective view of the flat spades 62, 64, 66 and 68 of the anode leads 40, 42 and 44 and the terminal pin 20 welded together into a bonding junction 60 after stacking them.

In another embodiment depicted in FIGS. 5 to 7, a bonding junction 60 for joining the anode leads to the anode terminal pin 20 is made by forming the exposed distal ends of the leads 40, 42 and 44 into respective flat spades 62, 64 and 66. The inner end of the terminal pin 20 is also formed into a flat spade 68. The flat spades 62, 64, 66 and 68 are then stacked together (FIG. 6) and joined to each other by a weld 70 (FIG. 7), or other suitable means, to electrically connect and mechanically join the anode leads 40, 42 and 44 and the terminal pin 20.

For the sake of simplicity of illustration in FIGS. 2 to 7, the sidewalls of the anodes 28, 30, 32 are shown in touching contact with each other. However, it is to be understood that small gaps are provided between the anode sidewalls to make room for the fitment of a separator and a cathode between and around each of the anodes. Additionally, the separator, which may be formed as individual pouches around each of the anodes 28, 30 and 32 may be fitted prior to forming the bonding junction between the anode leads 40, 42 and 44 and the terminal pin 20 as described above.

Referring again to FIG. 2, the header 16 is a unitary metal member such as of titanium having a cylindrical shape in cross-section and comprising an upper planar surface 72 spaced from a lower planar surface 74. Between the planar surfaces 72 and 74, the header 16 may include a perimeter region 76 comprised of an outer diameter leading to a step that joins to a frusto-conical portion that steps down to an inner diameter portion. This perimeter configuration is provided for engagement with the sidewall 14 of the casing 12, and for optimal support and electrical connection with the cathode 24 of capacitor 128 (FIG. 11) or the cathode 26 of capacitor 140 (FIG. 16). Additional details of one suitable configuration of the perimeter region 76 are provided in the aforementioned commonly owned U.S. Pat. No. 7,072,171.

A ferrule 78 for the glass-to-metal-seal (GTMS), which seals and electrically insulates the terminal pin 20 within the header 16, is formed integrally with the header. The ferrule 78 has a cylindrical sidewall and comprises a lower side 80 spaced below the lower header surface 74.

The GTMS comprises the ferrule 78 defining an internal cylindrical through bore or passage of constant inside diameter. An insulative glass (not shown) within the through bore provides a hermetic seal between the bore and the anode terminal pin 20 passing there through. The insulative glass, for example, may be ELAN® type 88 or MANSOL™ type 88. To provide support against shock and vibration conditions, a relatively fast curing polymeric material (not shown), such as a polyolefin, a fluoropolymer, a hot melt adhesive, or a UV curable adhesive may be filled into the space between the opposed planar end walls of the anode pellets 28, 30 and 32 and the lower header surface 74 to the edge forming the inner diameter portion of the header 16. A relatively slow curing silastic material may also be useful.

Figure 8:
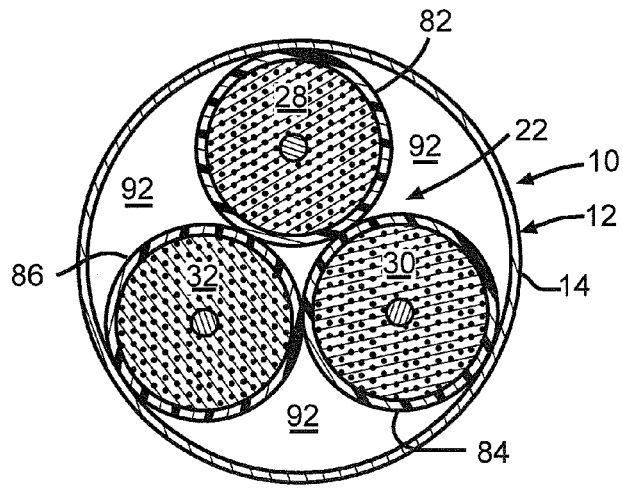
FIG. 8 is a cross-sectional view taken along line 8-8 of FIG. 1.

The shapes of the anodes forming the anode assembly and the shape of the casing enclosing the anode assembly within the capacitor may vary. FIG. 8 is a cross-sectional view of the anode assembly 22 of the capacitor 10 taken along line 8-8 of FIG. 1. The anode assembly 22, as described previously herein, is comprised of three anodes 28, 30 and 32. For the sake of simplicity of illustration, only the respective separator bags 82, 84 and 86 are shown enclosing the anodes 28, 30 and 32; no cathode is shown in FIG. 8. This is also the case for the capacitors 88 and 90 of FIGS. 9 and 10. Details of the structures of the cathodes are shown in FIGS. 11 to 18 and will be described hereinafter.

The capacitor 10 of FIG. 8 is considered to be less advantageous in that it is less volumetrically efficient, i.e. has less capacitance per unit volume. The arrangement of cylindrical anodes 28, 30 and 32 within a cylindrical casing 12 leaves a significant amount of void volume 92 between the anodes 28, 30 and 32. This void volume 92 only contains electrolyte and has no energy storage capacity.

Referring to FIG. 9, one way to reduce the void volume is to provide a capacitor 88 having an approximately cylindrical casing 94 with a sidewall 96 having cylindrical casing sidewall sections 98 with a curvature matched to that of the anodes 28, 30 and 32 interspersed with planar sections 100 there between. While this produces a more efficient capacitor by reducing the volume of the casing, the total capacitance is substantially the same as that of the capacitor 10 of FIG. 8. That is because the size of the anodes and cathodes (not shown) are the same for both of them.

Referring to FIG. 10, a more advantageous capacitor 90 is depicted, in which capacitor efficiency and total capacitance are both increased. Capacitor 90 is comprised of a casing 102 having a cylindrical sidewall 104, and an anode assembly 105 comprised of anodes 106, 108 and 110. Each of anodes 106, 108 and 110 is formed as a shaped structure having a radiused sidewall meeting first and second planar sidewall portions that extend to first and second anode end walls. The anodes are in a side-by-side relationship having the respective first and second planar sidewalls of adjacent anodes facing each other. The curvature of the radiused sidewalls of the anodes 106, 108 and 110 is matched to the curvature of the cylindrical casing sidewall 104. In that manner, the shape of anodes 106, 108 and 110 maximizes both the anode volume within the casing 102 and the area of the opposed surfaces of the anodes and the cathode within the casing 102 of the capacitor 90.

Anode leads 40, 42 and 44 are embedded in the respective anodes 106, 108 and 110. The distal ends (not shown) of the anode leads 40, 42 and 44 may be joined to an anode terminal pin in a bonding junction as shown in FIGS. 3 to 7 and described previously herein. The anodes 106, 108 and 110 are enclosed in a separator comprised of respective separator bags 112, 114 and 116. As stated previously, the cathode of capacitor 90 is not shown in FIG. 10 for the sake of simplicity of illustration. Two exemplary cathode configurations are shown in detail in respective FIGS. 11 to 18, and will now be described.

FIG. 11 is a detailed cross-sectional view of a capacitor 128 including the anode assembly 105 of FIG. 10, and a cathode 24 in a first configuration suitable for use with the anode assembly. Capacitor 128 is comprised of a casing 130 having a cylindrical casing sidewall 132 extending to closed first and second end walls that are not shown, but are substantially the same as the end walls 16 and 18 of capacitor 10 of FIG. 1.

A separator of electrically insulative material in the shape of a bag completely surrounds and envelops each anode 106, 108 and 110 except their respective extending wires 40, 42 and 44. Separator bags 134, 136 and 138 may include a seamed overlap (not shown) extending longitudinally along the respective anodes 106, 108 and 110. The separator prevents an internal electrical short circuit between the anode pellets 106, 108 and 110 of the anode assembly 105 and cathode active materials in the assembled capacitor and has a degree of porosity sufficient to allow flow there through of the working electrolyte during the electrochemical reaction of the capacitor 10. Illustrative separator materials include woven and non-woven fabrics of polyolefinic fibers including polypropylene and polyethylene or fluoropolymeric fibers including polyvinylidene fluoride, polytetrafluoroethylene, and polyethylenechlorotrifluoroethylene laminated or superposed with a polyolefinic or fluoropolymeric microporous film, non-woven glass, glass fiber materials and ceramic materials. Suitable microporous films include a polyethylene membrane commercially available under the designation SOLUPOR® (DMS Solutech), a polytetrafluoroethylene membrane commercially available under the designations EXCELLERATOR™ (W. R. Gore), ZITEX® (Chemplast Inc.), a polypropylene membrane commercially available under the designation CELGARD® (Celanese Plastic Company, Inc.), and a membrane commercially available under the designation DEXIGLAS® (C.H. Dexter, Div., Dexter Corp.). Cellulose based separators also typically used in capacitors are contemplated by the scope of the present invention. Depending on the electrolyte used, the separator can be treated to improve its wettability, as is well known by those skilled in the art.

FIG. 16 is a detailed cross-sectional view of a capacitor 140 including the anode assembly 105 of FIG. 10, and a cathode 26 in a second configuration suitable for use with the anode assembly. The capacitor 140 has substantially the same structure with respect to the casing 130, the first, second, and third anodes 106, 108 and 110, and the separator bags 134, 136 and 138. The cathodes 24 and 26 of the capacitors 128 and 140 are comprised of a first conductive substrate supporting a cathode active material. The conductive substrate is wrapped around the anodes, and the cathode active material is disposed on the substrate at locations such that the respective sidewalls of the anodes 106, 108 and 110 are opposed by cathode active material. The cathode may include two or three conductive substrates for a three anode capacitor. In the latter case (not shown), an individual cathode is wrapped around each of the anodes 106, 108 and 110 with cathode active material being opposed to the respective sidewalls of the anodes.

For capacitors comprised of cathodes having one or two conductive substrates, there are numerous different arrangements of the cathode active material on the conductive substrates that may be suitable. Where the cathode active material resides on the conductive substrates depends upon where wrapping of the cathode substrate around the anodes begins, and the pathway that the conductive substrate follows among the anodes. FIG. 11 depicts a first exemplary capacitor 128 with a cathode 24 comprised of a first conductive substrate 142 and a second conductive substrate 144, with related FIGS. 12 to 15 showing the cathode 24 separate from the capacitor 128 in an unwrapped state. Details of the cathode 24 of capacitor 128 will now be described.

The cathode 24 includes a first conductive substrate 142 and a second conductive substrate 144, each supporting a cathode active material 148. The conductive substrates 142, 144 are wrapped around the anodes 106, 108 and 110. The cathode active material 148 is disposed on the substrates 142 and 144 at locations such that the respective sidewalls of the anodes 106, 108 and 110 are opposed by the cathode active material 148. In the capacitor 128 of FIG. 11, the first conductive substrate 142 is wrapped around the first anode 106 and the second anode 108, and the second conductive substrate 144 is wrapped around the third anode 110.

The substrates 142 and 144 are of a material selected from titanium, tantalum, nickel, molybdenum, niobium, cobalt, stainless steel, tungsten, platinum, palladium, gold, silver, copper, chromium, vanadium, aluminum, zirconium, hafnium, zinc, iron, and mixtures and alloys thereof. Preferably, the substrates are of titanium and are from about 0.0005 inches to about 0.02 inches thick, preferably about 0.001 inches thick.

The cathode active material 148 has a thickness of about a few hundred Angstroms to about 0.1 millimeters directly coated on the conductive substrates 142 and 144. In that respect, the conductive substrates 142 and 144 may be of an anodized-etched conductive material, have a sintered active material with or without oxide contacted thereto, be contacted with a double layer capacitive material, for example a finely divided carbonaceous material such as activated graphite or activated carbon black, a redox, pseudocapacitive or an under potential material, or be an electroactive conducting polymer such as polyaniline, polypyrole, polythiophene, polyacetylene, and mixtures thereof.

According to one preferred aspect of the present invention, the redox or cathode active material 148 includes an oxide of a metal, the nitride of the metal, the carbon nitride of the metal, or the carbide of the metal, the oxide, nitride, carbon nitride and carbide having pseudocapacitive properties. The metal is preferably selected from the group consisting of ruthenium, cobalt, manganese, molybdenum, tungsten, tantalum, iron, niobium, iridium, titanium, zirconium, hafnium, rhodium, vanadium, osmium, palladium, platinum, nickel, lead, gold, silver, cobalt, and mixtures thereof. The cathode active material 148 can also be an activated carbonaceous material such as carbon nanotubes or amorphous carbon.

Figure 12:
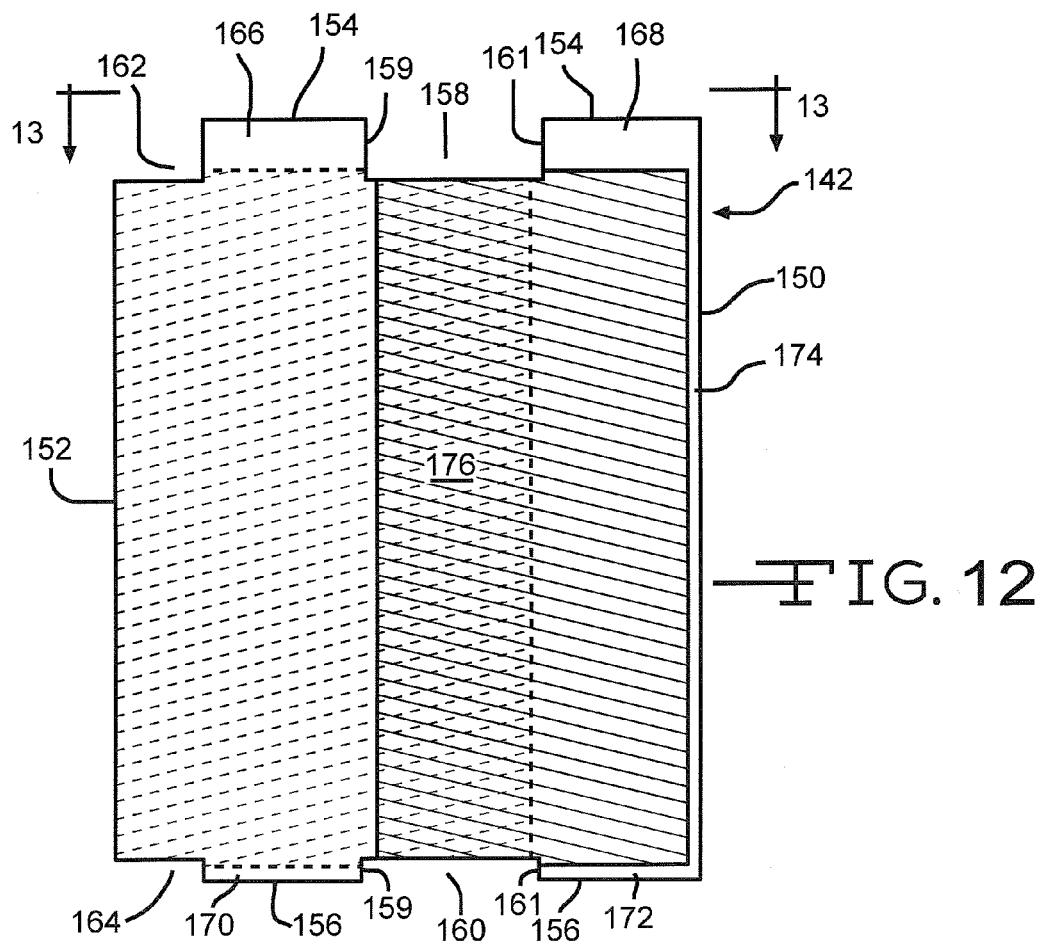
FIG. 12 is a side elevation view of a first portion of the cathode 24 of the capacitor 128 of FIG. 11, prior to wrapping it around the first and second anodes 106, 108 of the capacitor 128.
Figure 13:
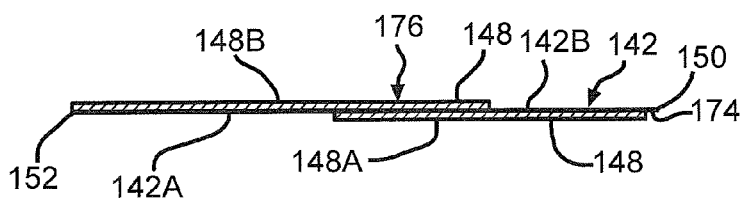
FIG. 13 is a plan view of the first portion of the cathode 24 taken along line 13-13 of FIG. 12.

Referring also to FIGS. 12 and 13, the substrate 142 comprises opposed major surfaces 142A and 142B extending to spaced apart right and left edges 150 and 152 meeting with an upper edge 154 and a lower edge 156. An upper inlet 158 is provided in the upper edge 154 between the right and left edges 150 and 152, while a lower inlet 160 is provided in the lower edge 156. An upper left notch 162 and a lower left notch 164 are also provided in the respective upper and lower edges 154 and 156. The upper inlet 158 and upper left notch 162 are somewhat deeper than the lower inlet 160 and lower left notch 164. This provides tabs 166, 168, 170 and 172 that are used to support the substrate 142 within the casing 12 and connect it thereto.

The cathode active material 148 coats or contacts the conductive substrate 142 at selected locations. A first section 148A of cathode active material is contacted to the first major surface 142A of the substrate 142 in a generally rectangular pattern in side elevation view spaced inwardly a short distance from the left edge 159 of the upper and lower inlets 158, 160 and extending toward the right substrate edge 150. The first cathode active section 148A has upper and lower edges that are parallel to the upper and lower substrate edges 154, 156 and spaced there from. In addition to tab 168, this configuration forms a right uncoated portion 174 extending from the right active material edge to the substrate edge 150.

A second section 148B of cathode active material is contacted to the second major substrate surface 142B in a generally rectangular pattern in side elevation view spaced inwardly a short distance from the right edge of the upper and lower inlets 158 and 160 and extending to the left substrate edge 152. The second cathode active section 148B has upper and lower edges that are parallel to the upper and lower substrate edges 154 and 156 and spaced there from. This provides the first and second cathode active sections 148A and 148B with an overlap region 176 having portions aligned in an overlaying relationship with each other on the respective major substrate surfaces 142A and 142B extending from the lower edge of the upper inlet 158 to the upper edge of the lower inlet 160.

Figure 14:
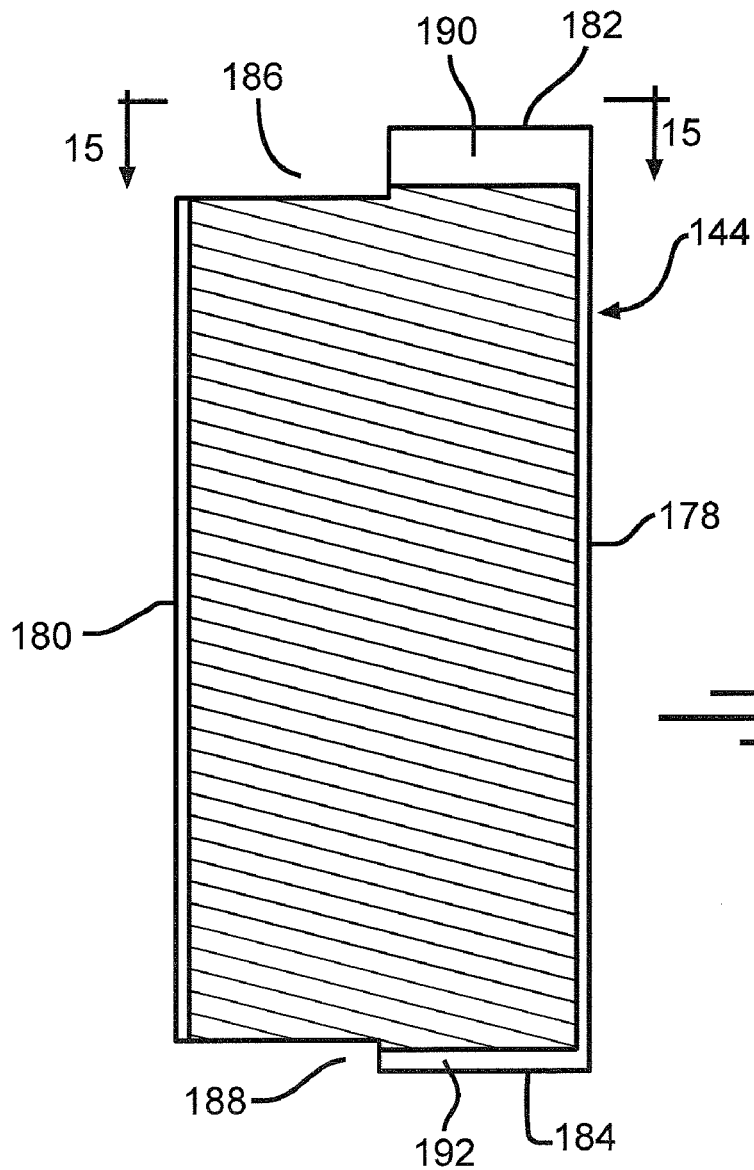
FIG. 14 is a side elevation view of a second portion of the cathode 24 of the capacitor 128 of FIG. 11, prior to wrapping it around the third anode 110 of the capacitor 128.
Figure 15:
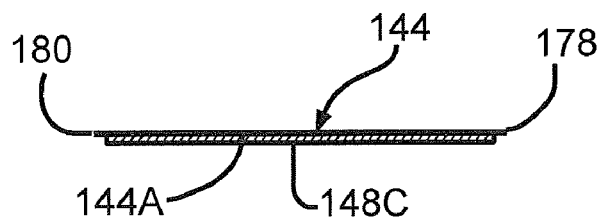
FIG. 15 is a plan view of the second portion of the cathode 24 taken along line 15-15 of FIG. 14.

Turning now to FIGS. 14 and 15, the substrate 144 of cathode 24 comprises a major surface 144A extending to spaced apart right and left edges 178 and 180. Right edge 178 meets with an upper edge 182 and a lower edge 184. An upper left notch 186 and a lower left notch 188 are also provided in the respective upper and lower edges 182 and 184. The upper left notch 186 is somewhat deeper than the lower left notch 188. This provides tabs 190 and 192 that are used to support the substrate 144 within the casing and connect it thereto.

The cathode active material 148 also coats or contacts the conductive substrate 144 at selected locations. As particularly shown in FIGS. 14 and 15, a third section 148C of cathode active material is contacted to the major surface 144A of the substrate 144 in a generally rectangular pattern in side elevation view spaced inwardly a short distance from the left edge 180 and from the right edge 178 of the substrate 144.

The pad printing process described in U.S. Pat. No. 7,116,547 is preferred for making the coatings 148A, 148B and 148C of cathode active material 148. Ultrasonically generated aerosol as described in U.S. Pat. Nos. 5,894,403; 5,920,455; 6,224,985; and 6,468,605, all to Shah et al., are also suitable deposition methods. These patents are assigned to the assignee of the present invention and incorporated herein by reference.

To assemble the anode assembly 105 with the cathode 24, the two conductive substrates 142 and 144 are formed into looped shapes corresponding to the respective anodes 106 and 108 and 110 around which they will be wrapped. The conductive substrate 142 is formed into a figure eight configuration to match the figure eight shape of the anode pair 106 and 108. The conductive substrate 144 is formed into a shape having two planar portions and a radiused portion to match the radiused anode sidewall meeting first and second planar sidewalls of anode 110. The anode assembly 105 is made so that small air gaps are present between the outer surfaces of the separator bags 136, 138 and 140 on the adjacent planar sidewalls of the anodes 106, 108 and 110. This provides spacing for the respective cathode substrates 142 and 144 with cathode active material 148 to be disposed between the sidewalls of the anodes 106, 108 and 110, thereby aligning the portions of cathode active material with the anode sidewalls.

To fit the conductive substrate 142 around the anodes 106, 108, the substrate formed in the figure eight configuration is slid axially along the gaps between the outer surfaces of the separator bags 134, 136 and 138 until the upper edge of the cathode active material adjacent to the inlet 158 is aligned with the upper end walls 30 of the anode pellets. As shown in FIG. 11, the first cathode active material section 148A "covers" in an opposing manner the semi-circular sidewall 194, and the first and second planar sidewalls 196 and 198 of anode pellet 106 in a first portion of the figure eight shape. Continuing on in a right-to-left direction along the conductive substrate 142 shown in the side elevation view in FIG. 12, the second cathode active material section 148B covers the first planar sidewall 200, the semi-circular sidewall 202, and the second planar sidewall 204 of the anode pellet 108 in a second portion of the figure eight shape. It can be seen that the overlapping region 176 of cathode active material 148A and 148B is disposed between the respective adjacent sidewalls 198 of anode 106 and 200 of anode 108.

The intermediate separator bags 134, 136 prevent direct physical contact between the cathode active material sections 148A and 148B and the respective anode pellets 106 and 108. The tabs 166 and 168 abut against an inner step of the header 16 (FIG. 2) below the frusto-conical section thereof as described and shown in the aforementioned U.S. Pat. No. 7,072,171, and are secured in place by laser welding to the header 16, which in turn is welded to the casing tube 14 to form the casing 12 (FIG. 1). (The casing 12 serves as the negative terminal of the capacitor 10.) The lower edge of the cathode active material adjacent to the lower substrate edge 156 is now aligned with the lower end walls of the anode pellets 106 and 108.

To fit the conductive substrate 144 around the anode 110, the conductive substrate 144 formed in a shape to match that of anode 110 is slid axially along the gap between the separator bag 138 and the cathode substrate 142 until the upper edge of the cathode active material adjacent to the notch 162 is aligned with the upper end wall of the anode pellet 110. As shown in FIG. 11, and with reference to a right-to-left direction along the conductive substrate 144 shown in the side elevation view in FIG. 14, the third cathode active material section 148C "covers" in an opposing manner the radiused sidewall 206, and the first and second planar sidewalls 208, 210 of anode pellet 110.

The intermediate separator bag 138 prevents direct physical contact between the cathode active material sections 148C and the anode pellet 110. The tab 182 abuts against an inner step of the header 16 (FIG. 2) below the frusto-conical section thereof and is secured in place by laser welding to the header 16. The lower edge of the cathode active material 148C adjacent to the lower substrate edge 184 is now aligned with the lower end wall of the anode pellet 110.

The thusly-constructed electrode assembly including the header 16 is next fitted to a casing tube 14. The casing tube 14 is a cylindrically shaped member that is open at both of its ends and made of the same metal as the header 16, for example, titanium. With the electrode assembly housed therein, the upper open-end of the tube 14 fits into a corresponding outer step of the header 16. Laser welding then hermetically seals the tube 14 to the header 16 at this junction.

The lower ends of the anode pellets 106, 108 and 110 and the lower edges 156 and 184 of the respective conductive substrates 142 and 144 comprising the associated cathode 24 are spaced from the lower open-end of the tube. A lower lid 18 (FIG. 1) is fitted in the lower open end of the tube 14 to close the capacitor 10. The lower lid 18 is a unitary metal member of the same material as the header 16 and casing tube 14. The lower lid 18 has a cylindrical shape in cross-section and comprises an upper planar surface spaced from a lower planar surface, and an outer diameter leading to a step that joins to a frusto-conical portion tapering downwardly and inwardly to the lower surface. The step is sized to fit into the lower open-end of the tube 14 in a snug-fitting relationship and is hermetically sealed therein, preferably by laser welding. In that manner, the header 16 closing the upper open end of the tube 14 and the lower lid 18 closing the lower open end form the casing 12 for the capacitor 10.

The lower lid 18 may be further provided with an opening (not shown) for filling a working electrolyte (not shown) into the casing. After the electrolyte is filled into the capacitor 10, a plug (not shown) is sealed in the opening by laser welding to hermetically close the casing 12.

Figure 17:
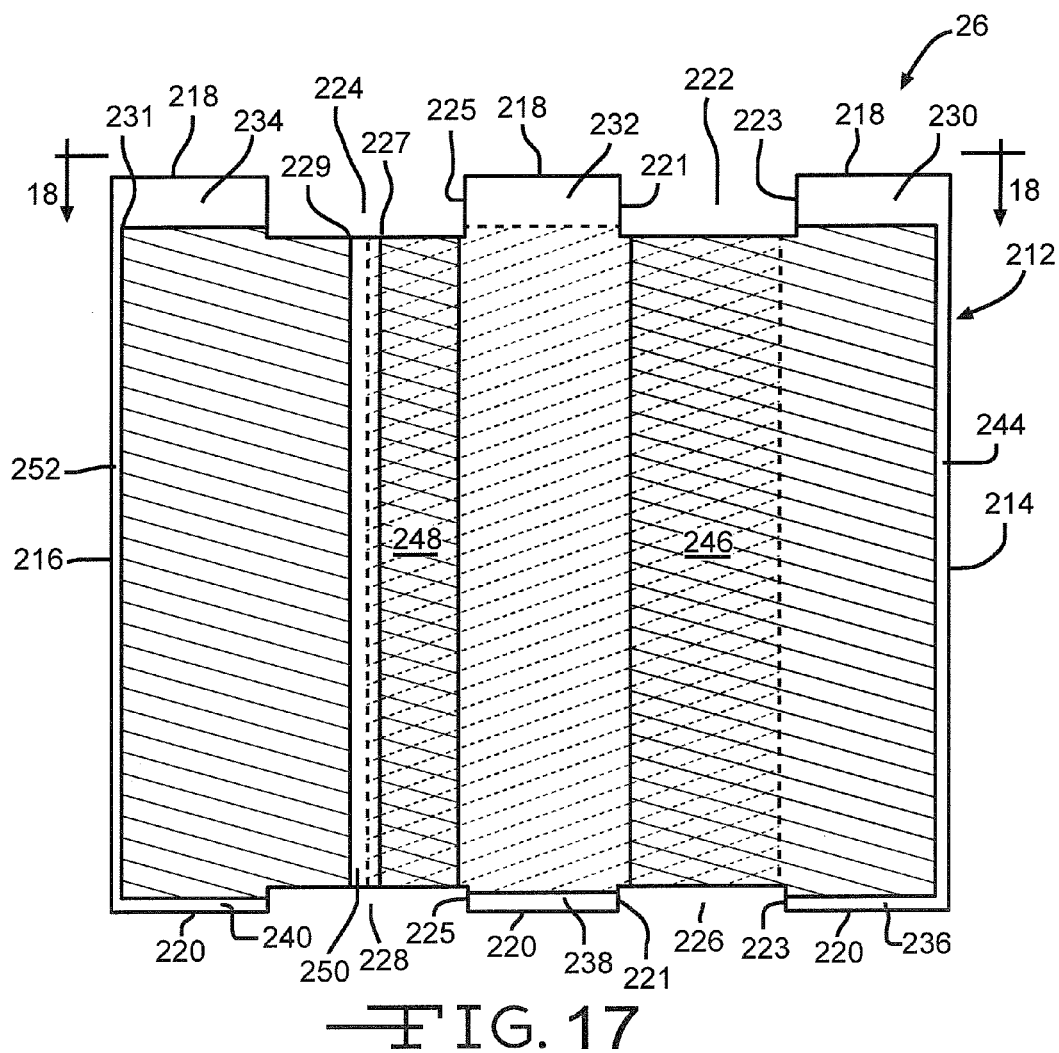
FIG. 17 is a side elevation view of the cathode 26 of the capacitor 140 of FIG. 15, prior to wrapping it around the anodes 106, 108, 110 of the capacitor 140.
Figure 18:
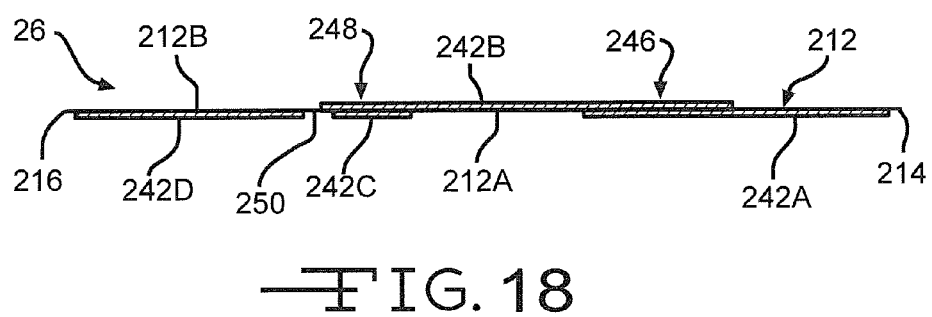
FIG. 18 is a plan view of the cathode taken along line 18-18 of FIG. 17.

FIG. 16 depicts a second exemplary capacitor 140 with a cathode 26 comprised of a first conductive substrate 212, with related FIGS. 17 and 18 showing the cathode 26 separate from the capacitor 128 in an unwrapped state. The details of the cathode 26 of capacitor 140 will now be described.

Cathode 26 includes a first conductive substrate 212 supporting cathode active material. The conductive substrate 212 is wrapped around the anodes 106, 108 and 110. The cathode active material is disposed on the substrate 212 at locations such that the respective sidewalls of the anodes 106, 108 and 110 are opposed by the cathode active material. The respective materials and thicknesses of the substrate and the cathode active material of the capacitor 140 are as recited for the capacitor 128 of FIGS. 11 to 15.

The substrate 212 comprises opposed major surfaces 212A and 212B extending to spaced apart right and left edges 214 and 216 meeting with an upper edge 218 and a lower edge 220. A first upper inlet 222 and a second upper inlet 224 are provided in the upper edge 218 between the right and left edges 214 and 216. A corresponding first lower inlet 226 and a second lower inlet 228 are provided in the lower edge 220 between the right and left edges 214 and 216. The upper inlets 222, 224 are somewhat deeper than the lower inlets 226 and 228. This provides upper tabs 230, 232 and 234 and lower tabs 236, 238 and 240 that are used to support the substrate 212 within the casing 12 and connect it thereto.

The cathode active material coats or contacts the conductive substrate 212 at selected locations. As particularly shown in FIGS. 17 and 18, a first section 242A of cathode active material is contacted to the first major surface 212A of the substrate 212 in a generally rectangular pattern in side elevation view spaced inwardly a short distance from the left edge 221 of the upper and lower inlets 222 and 226 and extending toward the right substrate edge 214. The first cathode active section 214A has upper and lower edges that are parallel to the upper and lower substrate edges 218 and 220 and spaced there from. In addition to tab 230, this configuration forms a right uncoated portion 244 extending from the right active material edge to the substrate edge 214.

A second section 242B of cathode active material is contacted to the second major substrate surface 212B in a generally rectangular pattern spaced inwardly a short distance from the right edge 223 of the upper and lower inlets 222 and 226 and extending to the left a short distance spaced inwardly from the right edge 225 of the upper and lower inlets 224, 228. The second cathode active section 212B has upper and lower edges that are also parallel to the upper and lower substrate edges 218 and 220 and spaced there from. As shown in FIGS. 17 and 18, this provides the first and second cathode active sections 242A and 242B with a first overlap region 246 having portions aligned in an overlaying relationship with each other on the respective major substrate surfaces 212A and 212B extending from the lower edge of the upper inlet 222 to the upper edge of the lower inlet 226.

A third section 242C of cathode active material is contacted to the first major substrate surface 212A in a generally rectangular pattern spaced inwardly a short distance from the right edge 225 of the upper and lower inlets 224 and 228 and extending to the left a short distance to a line 227 from the upper inlet 224 to the lower inlet 228. The third cathode active section 212C has upper and lower edges that are also parallel to the upper and lower substrate edges 218 and 220 and spaced there from. This provides the second and third cathode active sections 242B and 242C with a second overlap region 248 having portions aligned in an overlaying relationship with each other on the respective major substrate surfaces 212A and 212B extending from the lower edge of the upper inlet 224 to the upper edge of the lower inlet 228.

A fourth section 242D of cathode active material is contacted to the major surface 212A of the substrate 212 in a generally rectangular pattern from a line 229 to a line 231, both extending from the upper inlet 224 to the lower inlet 228. The fourth cathode active section 212D has upper and lower edges that are also parallel to the upper and lower substrate edges 218, 220 and spaced there from.

To assemble the anode assembly 105 with the cathode 26, the conductive substrate 212 is formed into a triple-looped shape corresponding to the shape of the anodes 106, 108 and 110 around which it will be wrapped. The conductive substrate 212 is formed into a double-loop figure eight configuration from right edge 214 to the narrow uncoated strip 250 to match the figure eight shape of the anode pair 106 and 108; and then from the uncoated strip 250 to the left edge 216 into a single loop shape having two planar portions and a radiused portion to match the radiused anode sidewall meeting the first and second planar sidewalls of anode 110.

To fit the conductive substrate 212 around the anodes 106 and 108, the conductive substrate 212 formed in the triple-looped configuration is slid axially along the gaps between the outer surfaces of the separator bags 134, 136 and 138, until the upper edge of the cathode active material adjacent to the inlets 222 and 224 is aligned with the upper end walls of the anode pellets. As shown in FIG. 16, the first cathode active material section 242A "covers" in an opposing manner the semi-circular sidewall 194, and the first and second planar sidewalls 196 and 198 of anode pellet 106 in a first portion of the figure eight shape. Continuing on in a right-to-left direction along the conductive substrate 212 shown in the side elevation view in FIG. 17, the second cathode active material section 242B covers the first planar sidewall 200, the semi-circular sidewall 202, and the second planar sidewall 204 of the anode pellet 108 in a second portion of the figure eight shape. It can be seen that the first overlapping region 246 of cathode active material 242A and 242B is disposed between the respective adjacent sidewalls 198 of anode 106 and 200 of anode 108. Additionally, the second overlapping region 248 is disposed between the respective adjacent sidewalls 204 of anode 108 and 208 of anode 110. In that manner, the third cathode active material section 242C covers in an opposing manner the first planar sidewall 208 of anode 110.

Continuing in a right-to-left direction, the conductive substrate 212 doubles back onto itself at the uncoated strip 250. This brings the fourth cathode active material 242D into contact with the separator bag 138 along the sidewall of anode 110. The fourth cathode active material 242D covers the second planar sidewall 210 and the radiused sidewall 206 of anode 110. The conductive substrate 212 ends at the uncoated edge 252 located between the anodes 108 and 110, near the inside surface of the casing sidewall 132.

The intermediate separator bags 134, 136 and 138 prevent direct physical contact between the cathode active material sections 212A, 212B, 212C and 212D and the respective anode pellets 106, 108 and 110. The tabs 230, 232 and 234 abut against an inner step of the header 16 (FIG. 2) below the frusto-conical section thereof, and are secured in place by laser welding thereto. The lower edge of the cathode active material adjacent to the lower substrate edge 220 is now aligned with the lower end walls of the anode pellets 106, 108 and 110.

The electrode assembly comprised of the anode assembly 105, the cathode 26, and the header 16 is next fitted to a casing tube 14. The header 16 is welded and sealed to the casing tube, a bottom cap 18 is also fitted and sealed to the casing tube 14, and the capacitor 140 is filled with electrolyte as recited previously for the capacitor 128 of FIG. 11.

It will be apparent that for capacitors comprised of cathodes having one or two conductive substrates as described herein and shown in FIGS. 11 to 18, there are numerous different arrangements of the cathode active material on the conductive substrates that may be suitable. Where the cathode active material is located on the conductive substrates depends upon where wrapping of the cathode substrate around the anodes begins, and the pathway that the conductive substrate follows among the anodes. Additionally, the location of the regions of cathode active material overlap may be varied. In general, any arrangement of cathode active material on the substrate that provides cathode active material in opposition to all of the sidewall surfaces of the respective anodes may be suitable. Such arrangements are thus to be considered as within the scope of the present invention.

It is also to be understood that the capacitors 10, 88, 90, 128 and 140 of respective FIGS. 8 to 11 and 16 comprised of anode assemblies having three anodes are to be considered as exemplary, and that capacitors of the present invention are not limited to having only three anodes. It will be apparent that analogous capacitors having four or more anodes may be provided with the requisite anode pellet and casing shapes, joined anode leads, separators, and cathodes with cathode active material positioned to oppose the anode sidewalls.

It is, therefore, apparent that there has been provided, in accordance with the present invention, capacitors comprised of multiple anodes, and methods for making the capacitors. While this invention has been described in conjunction with preferred embodiments thereof, it is evident that many alternatives, modifications, and variations will be apparent to those skilled in the art. Accordingly, the present invention is intended to embrace all such alternatives, modifications and variations that fall within the broad scope of the appended claims.

What is claimed is:

1. A capacitor, which comprises:
a) a casing;
b) a first anode and a second anode, each anode comprising an anode sidewall and a conductive anode lead extending therefrom;
c) an anode terminal pin comprising a terminal pin sidewall having a distal pin end located outside the casing for connection to a load and extending along a length to a proximal pin end;
d) a glass-to-metal seal hermetically sealing between and against an opening in the casing and the terminal pin sidewall at a location intermediate the distal and proximal pin ends, wherein the proximal pin end is physically connected to at least one of the anode leads electrically connected to each other by a hoop enclosing the proximal pin end and the anode leads to thereby form a bonding junction inside the casing spaced from the glass-to-metal seal;
e) a cathode comprising a conductive substrate supporting a cathode active material facing the anodes to provide an electrode assembly housed inside the casing;
f) a separator positioned between the side-by-side anodes and the cathode to prevent them from contacting each other; and
g) a working electrolyte contacting the anode and the cathode contained inside the casing.

2. The capacitor of claim 1 wherein the hoop is conductive.

3. The capacitor of claim 2 wherein the hoop is joined to at least one of the proximal end of the terminal pin and the distal ends of the conductive leads of the first and second anodes by a weld.

4. The capacitor of claim 1 wherein each anode is comprised of a radiused anode sidewall meeting first and second planar sidewalls extending to first and second anode end walls, and wherein the anodes are in a side-by-side relationship having their respective first and second planar sidewalls facing each other.

5. The capacitor of claim 4 wherein the cathode is comprised of a first conductive substrate comprised of first and second major faces supporting cathode active material opposing the sidewalls of the first and second anodes.

6. The capacitor of claim 5 wherein the first conductive substrate opposed the first and second anodes in a figure eight pattern.

7. The capacitor of claim 6 wherein a third anode has at least some of its sidewall opposed by cathode active material.

8. The capacitor of claim 1 wherein the cathode is comprised of a conductive substrate comprised of first and second major faces supporting cathode active material thereon such that the sidewalls of the first and second anodes are opposed by cathode active material.

9. The capacitor of claim 8 wherein each anode is comprised of a radiused anode sidewall meeting first and second planar sidewall portions extending to first and second anode end walls, wherein the anodes are in a side-by-side relationship having the respective first and second planar sidewall portions facing each other.

10. The capacitor of claim 1 further comprising a third anode in a side-by-side relationship with the first and second anodes with the anodes having their respective sidewalls aligned parallel to each other, wherein each of the conductive leads of the first, second and third anodes are formed into a cluster at the bonding junction comprising the hoop enclosing the anode leads connected to the anode terminal pin.

11. A capacitor, which comprises:
a) a casing having a cylindrical casing sidewall extending to closed first and second end walls;
b) an anode assembly comprising a first anode, a second anode, and a third anode, each anode comprising an anode sidewall extending to first and second anode end walls and a conductive anode lead extending therefrom, wherein the anodes are in a side-by-side relationship having their respective sidewalls aligned parallel to each other;
c) an anode terminal pin comprising a terminal pin sidewall having a distal pin end located outside the casing for connection to a load and extending along a length to a proximal pin end;
d) a glass-to-metal seal hermetically sealing between and against an opening in the casing and the terminal pin sidewall at a location intermediate the distal and proximal pin ends, wherein the proximal pin end is physically connected to at least one of the anode leads electrically connected to each other by a hoop enclosing the proximal pin end and the anode leads to thereby form a bonding junction inside the casing spaced from the glass-to-metal seal;
e) a cathode comprised of a first conductive substrate including first and second major faces supporting cathode active material opposing the sidewalls of the first and second anodes;
f) a separator positioned between the side-by-side anodes and the cathode to prevent them from contacting each other; and
g) a working electrolyte contained inside the casing and contacting the anode and the cathode.

12. The capacitor of claim 11 wherein the third anode has at least some of its sidewall opposed by cathode active material.

13. The capacitor of claim 12 wherein the first conductive substrate opposes the first and second anodes in a figure eight pattern.

14. The capacitor of claim 12 wherein each anode is comprised of a radiused anode sidewall meeting first and second planar sidewall portions extending to first and second anode end walls, wherein the anodes are in a side-by-side relationship having the respective first and second planar sidewall portions facing each other.

15. A method for making a capacitor, which comprises:
a) providing a casing having a casing sidewall extending to an open end;
b) providing at least a first anode and a second anode, each anode comprising an anode sidewall and a conductive anode lead extending therefrom;
c) providing an anode terminal pin comprising a terminal pin sidewall having a length extending from a distal pin end to a proximal pin end;
d) providing a cathode comprising a conductive substrate supporting a cathode active material facing the first and second anodes but prevented from contact therewith by an intermediate separator to thereby form an electrode assembly;
e) forming a glass-to-metal seal hermetically sealing between and against an opening in a casing lid and the terminal pin sidewall at a location intermediate the distal and proximal pin ends;
f) physically connecting the proximal pin end to at least one of the anode leads being electrically connected to each other by a hoop enclosing the proximal pin end and the anode leads to thereby form a bonding junction spaced from the glass-to-metal seal;
g) moving the electrode assembly into the casing through the open end thereof and then sealing the lid to the casing sidewall to form a closed casing housing the electrode assembly; and
h) filling a working electrolyte inside the casing through a fill port to contact the first and second anodes and the cathode comprising the electrode assembly, and sealing the fill port.

16. The method of claim 15 wherein each anode is comprised of a radiused anode sidewall meeting first and second planar sidewall portions extending to first and second anode end walls, and wherein the anodes are in a side-by-side relationship having the respective first and second planar sidewall portions facing each other.

17. A method for making a capacitor, which comprises:
a) providing a casing having a cylindrical casing sidewall extending to an open end;
b) providing a first anode, a second anode and a third anode, each anode comprising an anode sidewall extending to first and second anode end walls and a conductive anode lead extending therefrom, wherein the anodes are in a side-by-side relationship having their respective sidewalls parallel to each other;
c) providing an anode terminal pin comprising a terminal pin sidewall having a length extending from a distal pin end to a proximal pin end;
d) providing a cathode comprising a first conductive substrate including first and second major faces supporting cathode active material, the first conductive substrate positioned with respect to the first and second anodes such that the sidewalls of the first and second anodes are opposed by cathode active material but prevented from contact therewith by an intermediate separator to thereby form an electrode assembly;
e) forming a glass-to-metal seal hermetically sealing between and against an opening in a casing lid and the terminal pin sidewall at a location intermediate the distal and proximal pin ends;
f) physically connecting the proximal pin end to at least one of the anode leads being electrically connected to each other by a hoop enclosing the proximal pin end and the anode leads to thereby form a bonding junction spaced from the glass-to-metal seal;
g) moving the electrode assembly into the casing through the open end thereof and then sealing the lid to the open casing end to thereby close the casing housing the electrode assembly; and
h) filling a working electrolyte into the casing through a fill port, and sealing the fill port.

18. The method of claim 17 wherein the first conductive substrate is further positioned with respect to the third anode such that the sidewall of the third anode is opposed by cathode active material but prevented from contact therewith by the intermediate separator.

19. The method of claim 17 wherein each anode is comprised of a radiused anode sidewall meeting first and second planar sidewall portions extending to first and second anode end walls, and wherein the anodes are in a side-by-side relationship having the respective first and second planar sidewall portions facing each other.

* * * * *